United States Patent
Kawai et al.

(10) Patent No.: US 9,694,870 B2
(45) Date of Patent: Jul. 4, 2017

(54) MOTORCYCLE

(71) Applicant: KAWASAKI JUKOGYO KABUSHIKI KAISHA, Kobe-shi, Hyogo (JP)

(72) Inventors: Hideaki Kawai, Kakogawa (JP); Shigeyuki Iwata, Kakogawa (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 14/857,593

(22) Filed: Sep. 17, 2015

(65) Prior Publication Data

US 2016/0096582 A1 Apr. 7, 2016

(30) Foreign Application Priority Data

Oct. 2, 2014 (JP) .................. 2014-203762

(51) Int. Cl.
| | |
|---|---|
| B62K 11/02 | (2006.01) |
| B62K 25/04 | (2006.01) |
| B62K 11/04 | (2006.01) |
| B62K 19/20 | (2006.01) |

(52) U.S. Cl.
CPC .............. B62K 25/04 (2013.01); B62K 11/04 (2013.01); B62K 19/20 (2013.01); *B62K 11/02* (2013.01)

(58) Field of Classification Search
CPC ........ B62K 25/04; B62K 19/20; B62K 11/04; B62K 11/02
See application file for complete search history.

(56) References Cited

U.S. PATENT DOCUMENTS

| | | | |
|---|---|---|---|
| 5,480,001 A | 1/1996 | Hara | |
| 5,984,336 A * | 11/1999 | Hanafusa | B62K 11/04 180/227 |

(Continued)

FOREIGN PATENT DOCUMENTS

| | | |
|---|---|---|
| EP | 1698548 A1 | 9/2006 |
| EP | 2468612 A1 | 6/2012 |

(Continued)

OTHER PUBLICATIONS

European Patent Office, Extended European Search Report Issued in Application No. 15187426.0, Mar. 8, 2016, 13 pages.

*Primary Examiner* — Joseph Rocca
*Assistant Examiner* — Gabriela C Craciun
(74) *Attorney, Agent, or Firm* — Alleman Hall Creasman & Tuttle LLP

(57) ABSTRACT

A motorcycle comprises a rear wheel; a vehicle body frame including a front frame unit supporting a motor, and a rear frame unit supporting a seat; and a swing arm which is rotatably connected to the front frame unit and supports the rear wheel, wherein the rear frame unit includes: a front section which supports the seat and extends rearward from the front frame unit; a pair of right and left branch sections extending rearward from a rear end portion of the front section to be spaced apart from each other in a rightward and leftward direction; and a pair of rear sections which extend rearward from rear end portions of the pair of right and left branch sections, respectively, and are placed rightward and leftward relative to the rear wheel.

15 Claims, 5 Drawing Sheets

(56) References Cited

U.S. PATENT DOCUMENTS

| | | | |
|---|---|---|---|
| 7,950,487 B2* | 5/2011 | Nakamura | B62K 11/04 180/226 |
| 2006/0283650 A1* | 12/2006 | Kawamura | B62K 19/06 180/227 |
| 2009/0229908 A1 | 9/2009 | Ito | |
| 2011/0232987 A1* | 9/2011 | Chipp | B62J 1/12 180/311 |
| 2013/0020781 A1* | 1/2013 | Kishikawa | B62K 19/20 280/281.1 |
| 2014/0265230 A1* | 9/2014 | Oikawa | B62J 35/00 280/281.1 |
| 2015/0068829 A1* | 3/2015 | Ishida | B62K 19/04 180/219 |
| 2016/0214671 A1* | 7/2016 | Taguma | B62J 6/04 |

FOREIGN PATENT DOCUMENTS

| | | |
|---|---|---|
| JP | 2010023830 A | 2/2010 |
| WO | 2006109484 A1 | 10/2006 |

* cited by examiner

MOTORCYCLE

CROSS-REFERENCE TO THE RELATED APPLICATION

This application claims priority to and the benefit of Japanese Patent Application No. 2014-203762, filed on Oct. 2, 2014, the entire disclosure of which is incorporated herein by reference.

BACKGROUND OF THE INVENTION

Field of the Invention

The present invention relates to a motorcycle in which a rear wheel is supportedly mounted to a swing arm.

Description of the Related Art

There are many types of motorcycles corresponding to users preferences. Among them, there is a motorcycle of an American type disclosed in Japanese Laid-Open Patent Application Publication No. 2010-23830.

SUMMARY OF THE INVENTION

In an exemplary motorcycle such as the American type of motorcycle which prioritizes providing a more comfortable ride for a rider, the height of a seat on which the rider can be seated is reduced so that the rider can ground their feet easily. However, if an attempt is made to reduce the height of the seat, a frame located below the seat will become an obstacle. For this reason, there is a limitation on the reduction of the height of the seat. In addition, if the height of the seat is reduced, a clearance formed between the seat and the frame located below the seat becomes smaller. This reduces a space below the seat in which components mounted to a vehicle body are placed.

In view of the above, an object of the present invention is to reduce the height of the seat and ensure a space in which components mounted to the vehicle body are placed, in a motorcycle.

According to an aspect of the present invention, a motorcycle comprises: a rear wheel; a motor which generates driving power for driving the rear wheel; a seat on which a rider is seated; a vehicle body frame including a front frame unit supporting the motor, and a rear frame unit supporting the seat; and a swing arm which is rotatably connected to the front frame unit and supports the rear wheel in a state in which the swing arm is vertically pivotable around a pivot shaft at which the swing arm is connected to the front frame unit, wherein the rear frame unit includes: a front section which supports the seat and extends rearward from the front frame unit; a pair of right and left branch sections extending rearward from a rear end portion of the front section to be spaced apart from each other in a rightward and leftward direction; and a pair of rear sections which extend rearward from rear end portions of the pair of right and left branch sections, respectively, and are placed rightward and leftward relative to the rear wheel.

In accordance with this configuration, since the pair of rear sections are placed rightward and leftward relative to the rear wheel, the branch sections and the front section can be placed in lower positions while preventing an interference with the rear wheel, which makes it possible to place the seat at a lower position. Since the branch sections are provided rearward relative to the front frame unit, the dimension in the rightward and leftward direction, of the frame (namely, front section) located between the front frame unit and the branch sections can be reduced, and hence the space in which the components mounted to the vehicle body are placed can be ensured easily, even though the seat is placed at a lower position. Therefore, the height of the seat can be reduced, and the space in which the components mounted to the vehicle body are placed can be ensured.

In the above motorcycle, a portion of each of the rear sections may overlap with a portion of the rear wheel when viewed from a side, in a state in which at least the swing arm is pivoted to be closest to the rear section.

In accordance with this configuration, the position of the front section can be further lowered, while preventing an interference between the branch sections and the rear wheel. Therefore, the rider can ground their feet more easily.

In the above motorcycle, a portion of each of the branch sections may overlap with a portion of the rear wheel when viewed from a side in a state in which at least the swing arm is pivoted to be closest to the rear section.

In accordance with this configuration, the front section can be placed in a location that is as forward as possible, and hence the length of the branch sections in the forward and rearward direction can be increased. This can allow the branch sections to curve gently. As a result, the rear frame unit can be formed easily.

In the above motorcycle, the rear sections may have a dimension in the rightward and leftward direction which is smaller than a dimension of the branch sections in the rightward and leftward direction.

In accordance with this configuration, an increase in the dimension of the whole of the vehicle body in the rightward and leftward direction can be prevented.

In the above motorcycle, each of the rear sections may include a portion having a vertical dimension larger than a vertical dimension of the branch section.

In accordance with this configuration, the rear sections have a larger vertical dimension although the rear sections have a smaller dimension in the rightward and leftward direction. Because of this structure, a decrease in the stiffness of the rear sections can be prevented.

In the above motorcycle, each of the branch sections may include a pair of right and left members which are joined to each other by welding and have a closed cross-section in a direction perpendicular to a lengthwise direction of the branch section, and each of the rear sections may include a pair of right and left members which are joined to each other by welding and have a closed cross-section in a direction perpendicular to a lengthwise direction of the rear section.

In accordance with this configuration, the rear section of the rear frame unit can be formed easily to have a shape in which the dimension of the cross-section in the direction perpendicular to its lengthwise direction is varied along the lengthwise direction. Also, since the rear frame unit tends to be subjected to a vertical load, the configuration in which the pair of right and left members are joined to each other can contribute to an increase in the stiffness.

In the above motorcycle, the vehicle body frame may further include auxiliary frame members connecting the front frame unit to the rear sections of the rear frame unit, and each of the auxiliary frame members may be connected to the front frame unit in a location that is below a portion of the front frame unit, the portion being connected to the front section of the rear frame unit.

In accordance with this configuration, since each of the auxiliary frame members is connected to the front frame unit in a location that is below the front section, the rear frame unit can be reinforced while ensuring the space in which the components mounted to the vehicle body are placed, in a location that is below the front section.

In the above motorcycle, each of the rear sections of the rear frame unit may have a connection portion connected to the auxiliary frame member, and the connection portion may have a vertical dimension larger than a vertical dimension of an adjacent portion of the rear section which is adjacent to the connection portion in a lengthwise direction of the rear section.

In accordance with this configuration, the stiffness of the portion of the rear section which is connected to the auxiliary frame member is increased and the stiffness of the remaining portion is reduced. Thus, the weight of the rear section can be reduced, and the strength of the rear section can be maintained.

In the above motorcycle, the rear frame unit may further include a bridge section connecting the pair of rear sections to each other in the rightward and leftward direction, right and left ends of the bridge section may be connected to upper ends of the pair of rear sections, respectively, and the bridge section may have a circular-arc shape protruding upward when viewed from a rear.

In accordance with this configuration, even in the state in which the swing arm is pivoted to be closest to the rear frame unit, a distance between the bridge section and the rear wheel can be ensured appropriately. Also, in the configuration in which the right and left ends of the bridge section are connected to the upper ends of the rear sections, a distance formed between the pair of right and left rear sections can be ensured appropriately.

The above and further objects, features, and advantages of the present invention will more fully be apparent from the following detailed description of the preferred embodiment with the accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. The stated directions are from the perspective of a rider straddling a motorcycle. A vehicle width direction corresponds with a rightward and leftward direction.

Figure 1:
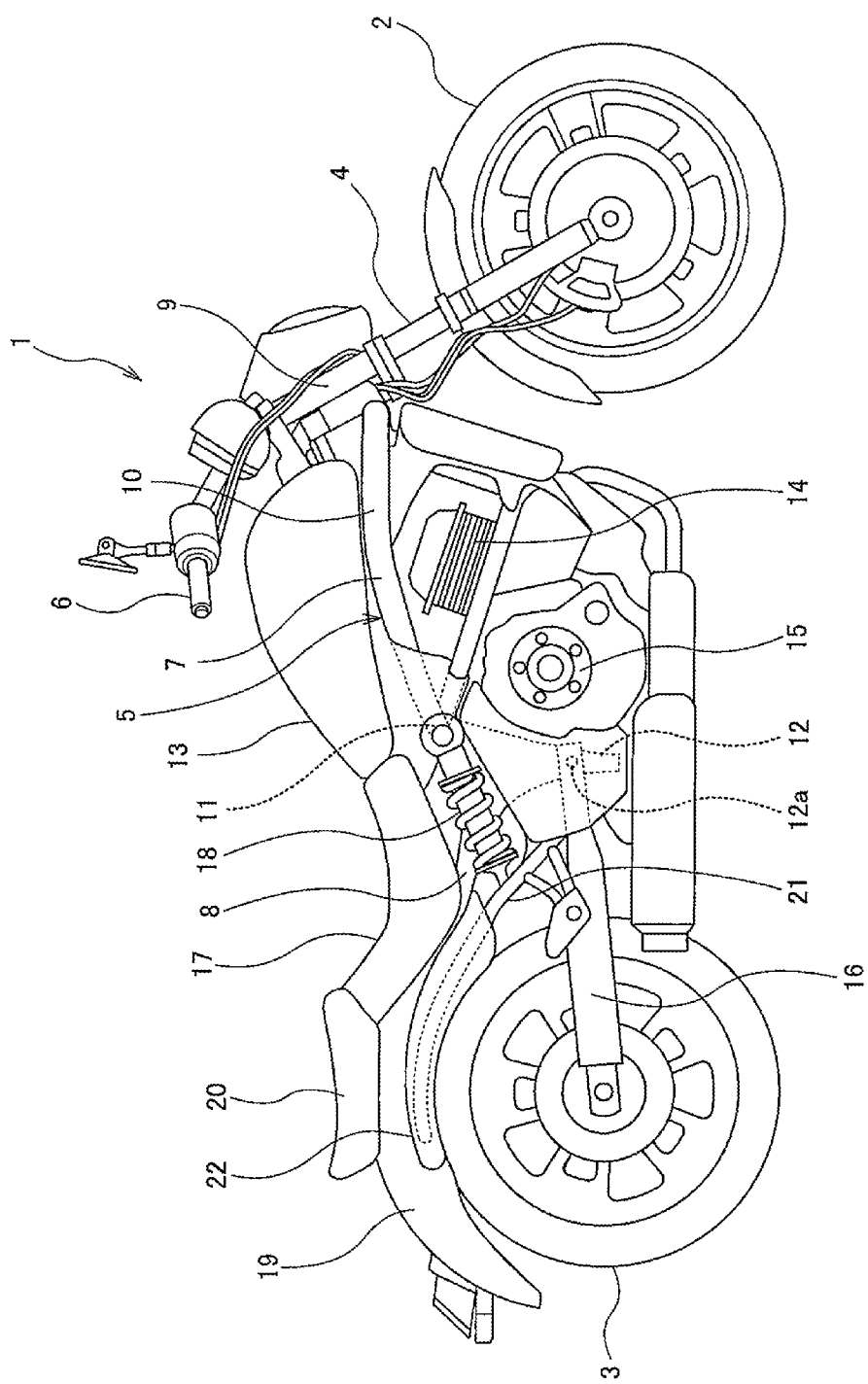
FIG. 1 is a right side view of a motorcycle according to an embodiment.

FIG. 1 is a right side view of a motorcycle 1 according to the embodiment. As shown in FIG. 1, the motorcycle 1 includes a front wheel 2 which is a driven wheel, and a rear wheel 3 which is a drive wheel. The front wheel 2 is rotatably connected to the lower end portion of a front fork 4 extending substantially vertically. The front fork 4 is supported by a steering shaft (not shown) via a bracket (not shown). The steering shaft (not shown) is rotatably supported by a head pipe 9 of a vehicle body frame 5. A handle 6 operated by the rider is attached to the bracket.

The vehicle body frame 5 includes a front frame unit 7, and a rear frame unit 8 extending rearward from the front frame unit 7. The front frame unit 7 includes the head pipe 9, a pair of right and left main frame members 10 extending rearward from the head pipe 9, a cross member 11 connecting the rear end portions of the pair of main frame members 10 to each other in the rightward and leftward direction, and a pivot frame member 12 extending downward from the cross member 11. A fuel tank 13 is disposed above the main frame members 10. An engine 14 (motor) for generating driving power for rotating the rear wheel 3 is supportedly mounted to the main frame members 10 and the pivot frame member 12. A transmission 15 is connected to the engine 14, and the driving power output from the transmission 15 is transmitted to the rear wheel 3 via a driving power transmission mechanism (e.g., chain). The front end portion of a swing arm 16 extending in a forward and rearward direction is mounted to the pivot frame member 12 such that the swing arm 16 is vertically pivotable. The rear wheel 3 is rotatably mounted to the rear end portion of the swing arm 16. In summary, the swing arm 16 is rotatably coupled to the pivot frame member 12 and supports the rear wheel 3 such that the swing arm 16 is vertically pivotable around a pivot shaft 12a at which the swing arm 16 is connected to the pivot frame member 12.

The rear frame unit 8 supports a rider seat 17 which is placed behind the fuel tank 13 and on which the rider can be seated. A rear suspension 18 is placed in a location that is lateral (in this example, rightward) relative to the front portion of the rear frame unit 8 and connects the front frame unit 7 to the swing arm 16. The rear portion of the rear frame unit 8 supports the lower portion of a rear fender 19 covering the rear wheel 3 from above. The rear fender 19 has a circular-arc shape protruding upward when viewed from the side. The rear fender 19 has a circular-arc shape protruding upward in a cross-section which is taken along a direction perpendicular to the forward and rearward direction. A tandem seat 20 on which a passenger can be seated is disposed over the rear fender 19. The tandem seat 20 is supported by the rear portion of the rear frame unit 8. The vehicle body frame 5 includes auxiliary frame members 21 connecting the front frame unit 7 to the rear frame unit 8. The rear portions of the auxiliary frame members 21 are covered from the side by covers 22, respectively, which are different from the rear fender 19.

Figure 2:
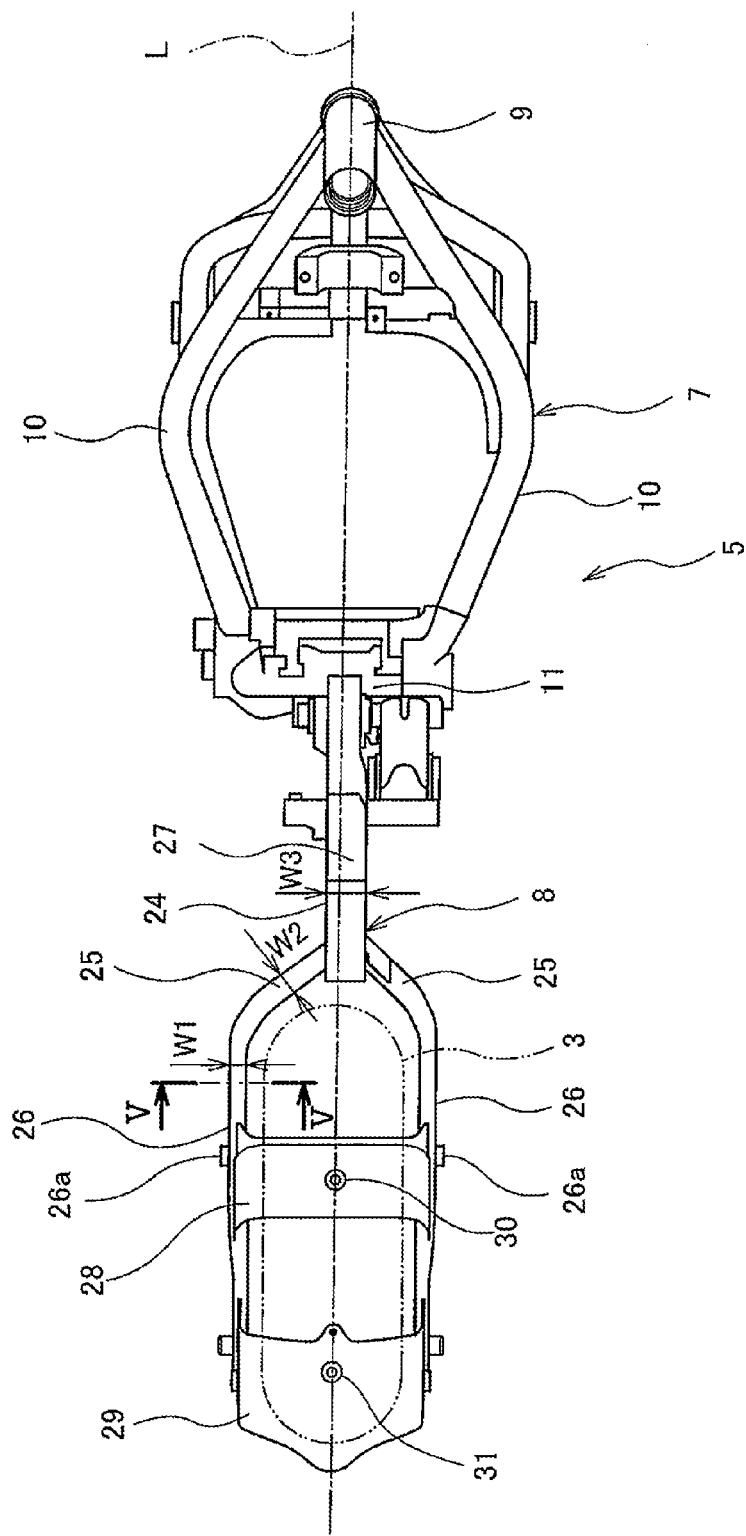
FIG. 2 is a plan view of a vehicle body frame of the motorcycle of FIG. 1, showing the configuration of the frame members of the vehicle body frame when viewed from above.
Figure 3:
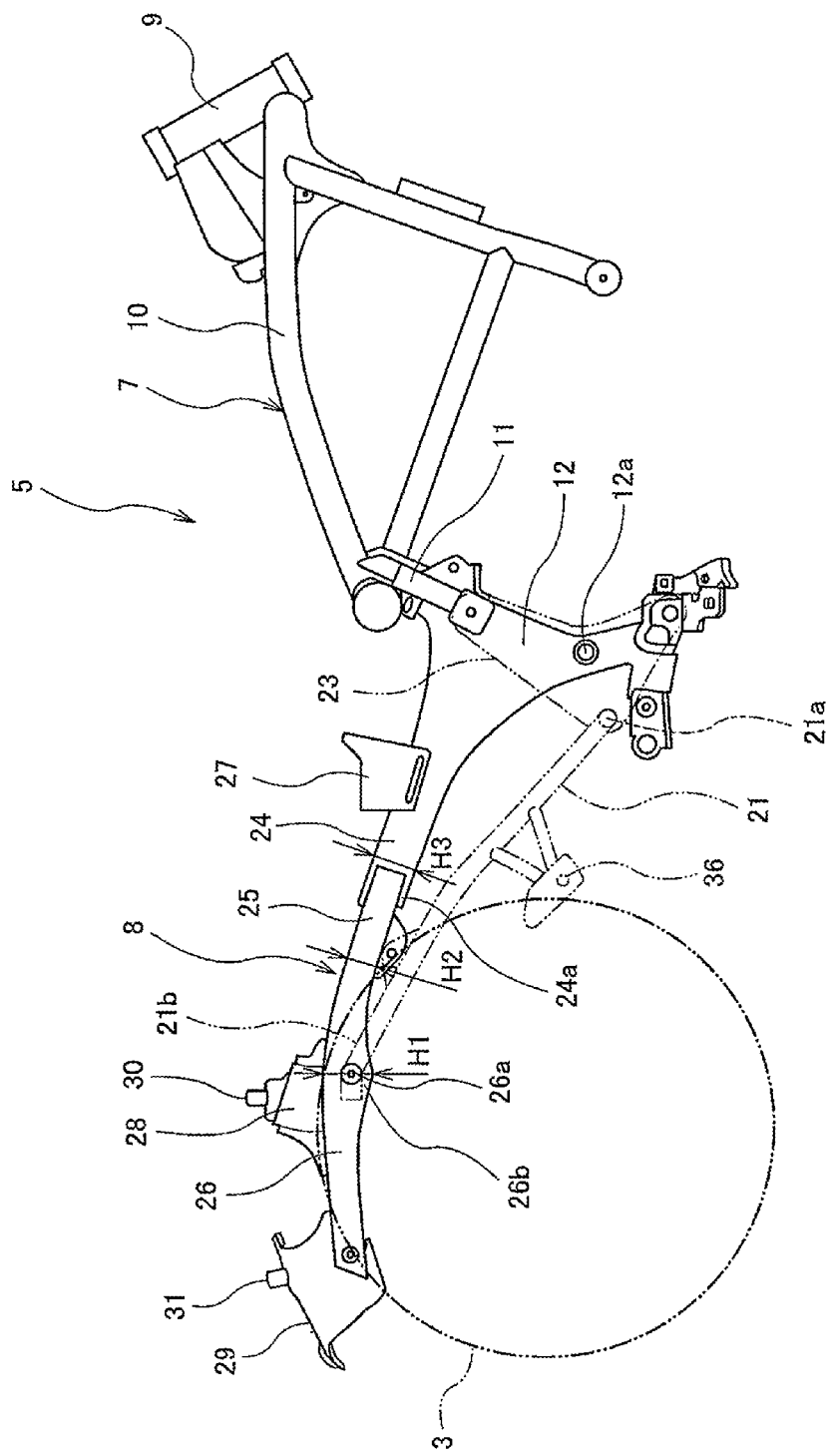
FIG. 3 is a right side view of the vehicle body frame of FIG. 3.
Figure 4:
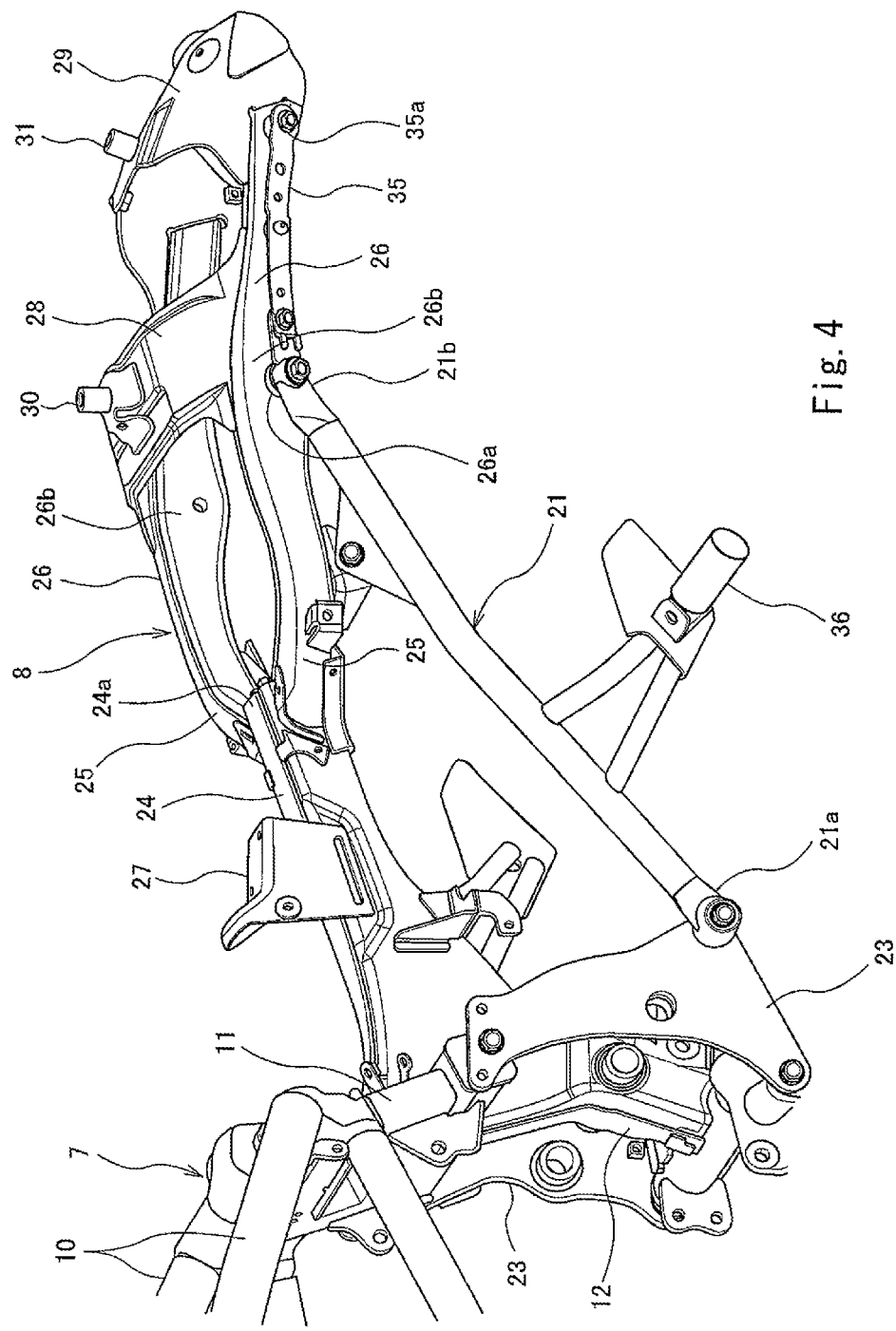
FIG. 4 is an enlarged perspective view of the frame members of the vehicle body frame of FIG. 2, when viewed from the left and front.

FIG. 2 is a plan view of the vehicle body frame 5 of the motorcycle 1 of FIG. 1, showing the configuration of the frame members of the vehicle body frame 5 when viewed from above. In FIG. 2, the auxiliary frame members 21, reinforcement plates 23, and accessory brackets 35 are not shown. FIG. 3 is a right side view of the vehicle body frame 5 of FIG. 3. FIG. 4 is an enlarged perspective view of the frame members of the vehicle body frame 5 of FIG. 2, when viewed from the left and front. As shown FIGS. 2 and 4, the pair of right and left main frame members 10 constitute a twin frame. The pair of right and left main frame members 10 are located outward in the rightward and leftward direction relative to the rear frame unit 8. The pivot frame member 12 extends downward from the center portion of the cross member 11 in the vehicle width direction. When viewed from above, the pivot frame member 12 is placed to overlap with a vehicle body center line L extending in the forward and rearward direction through the center of the head pipe 9. More specifically, the pivot frame member 12 is placed on one side (in this example, right side) in the vehicle width direction in such a manner that the center axis of the pivot frame member 12 in the vehicle width direction extends in the forward and rearward direction to be rightward or leftward relative to the vehicle body center line L.

The reinforcement plates 23 are disposed rightward and leftward relative to the pivot frame member 12. Each of the upper end portions of the reinforcement plates 23 is fastened to the lower end portion of the cross member 11 from the side, by use of a bolt. The lower end portions of the reinforcement plates 23 are fastened to a tubular portion protruding rightward and leftward from the lower end portion of the pivot frame member 12, by use of bolts. In this way, the reinforcement plates 23 constitute a portion of the front frame unit 7.

The rear frame unit 8 extends rearward from the intermediate portion of the rear end portion of the front frame unit 7 in the vehicle width direction. The rear frame unit 8 includes a front section 24 extending upward and rearward from the upper portion of the pivot frame member 12 and supporting the rider seat 17, a pair of branch sections 25 extending obliquely rearward from the rear end portion of the front section 24 to be spaced apart from each other in the rightward and leftward direction, and a pair of rear sections 26 extending rearward from the rear end portions of the pair of branch sections 25, respectively, and located rightward and leftward relative to the rear wheel 3. The whole of the branch sections 25 and the rear sections 26 have a circular-arc shape protruding upward when viewed from the side. The front section 24 serves as a first rear stay, and the branch sections 25 (base sections) and the rear sections 26 (rail sections) serve as a second rear stay.

A seat bracket 27 on which the rider seat 17 is attached protrudes upward from the upper portion of the front section 24. Like the pivot frame member 12, the front section 24 is placed to overlap with the vehicle body center line L, when viewed from above, and on one side (in this example, right side) in the vehicle width direction in such a manner that the center axis of the front section 24 in the vehicle width direction extends in the forward and rearward direction to be rightward or leftward relative to the vehicle body center line L. A portion of the pivot frame member 12 which supports the swing arm 16 is larger in dimension in the vehicle width direction than the front section 24 is. The front section 24 extends upward and rearward from the lower portion of the cross member 11 of the front frame unit 7. The lower portion of the cross member 11 is located below the rear end portions of the main frame members 10.

The pair of right and left branch sections 25 extend rearward and outward in the vehicle width direction, from the right and left side surfaces of the rear end portion of the front section 24. In other words, the right and left branch sections 25 are spaced apart from each other in the vehicle width direction as they extend rearward. The front section 24 and the pair of right and left branch sections 25 have a Y-shape when viewed from above. Each of the branch sections 25 faces a portion of the rear wheel 3 which is located in front of the upper end of the rear wheel 3 and above the front end of the rear wheel 3 and is close to the rider seat 17.

The rear sections 26 extend rearward along the vehicle body center line L. The rear sections 26 are continuous with the branch sections 25, respectively. A boundary between each of the branch sections 25 and the corresponding rear section 26 is defined as a location at which a change between the extending direction of the branch section 25 and the extending direction of the rear section 26 occurs. The rear sections 26 are located outward in the vehicle width direction relative to the rear wheel 3 when viewed from above. The rear frame unit 8 includes a first bridge section 28 coupling in the rightward and leftward direction, the center portions of the pair of right and left rear sections 26 in the forward and rearward direction, and a second bridge section 29 coupling in the rightward and leftward direction, the rear end portions of the pair of right and left rear sections 26. Each of the first bridge section 28 and the second bridge section 29 protrudes farther upward than the rear section 26 when viewed from the side, and has a circular-arc shape protruding upward when viewed from the rear.

The right and left ends of the first bridge section 28 are welded to the upper end surfaces of the center portions of the rear sections 26 in the forward and rearward direction, respectively. The second bridge section 29 protrudes farther rearward than the rear ends of the rear sections 26. The right and left ends of the second bridge section 29 are welded to the upper end surfaces, rear end surfaces, and lower end surfaces of the rear end portions of the rear sections 26. A rider seat fastening portion 30 used for fastening the rider seat 17 protrudes from the upper surface of the first bridge section 28. A tandem seat fastening portion 31 used for fastening the tandem seat 20 protrudes from the upper surface of the second bridge section 29.

Figure 5:
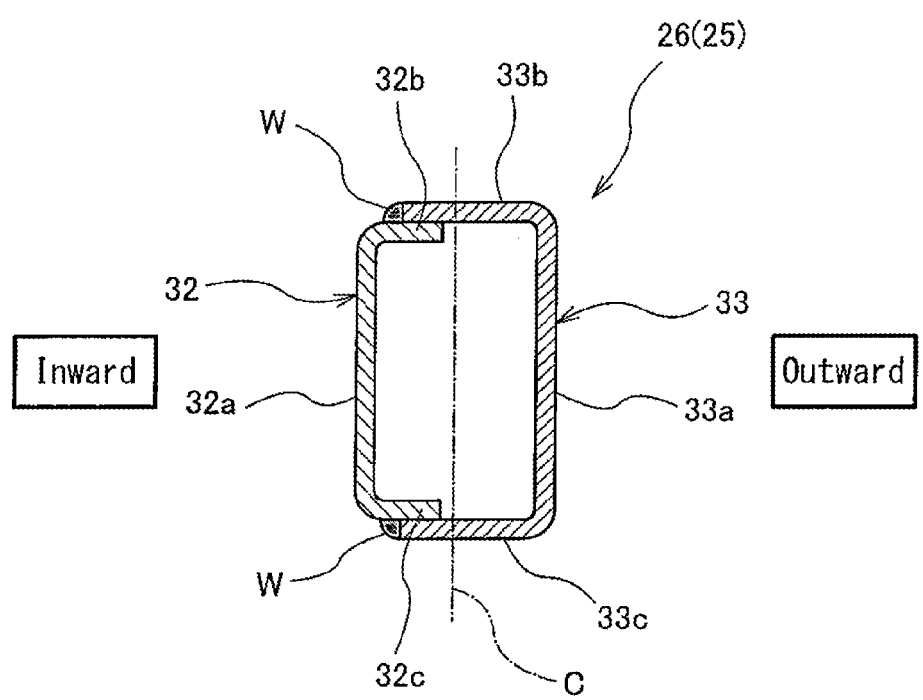
FIG. 5 is a cross-sectional view taken along line V-V of FIG. 2.

As shown in FIG. 5, each of the branch section 25 and the rear section 26 includes an inner plate member 32 and an outer plate member 33 which are joined to each other by welding and has a closed cross-section in a direction perpendicular to its lengthwise direction so as to form an inner hollow space S. The closed cross-section is vertically elongated. The inner plate member 32 includes a side wall portion 32a, an upper wall portion 32b protruding outward in the vehicle width direction from the upper end of the side wall portion 32a, and a lower wall portion 32c protruding outward in the vehicle width direction from the lower end of the side wall portion 32a. The inner plate member 32 has a recess shape which opens outward in the vehicle width direction. The outer plate member 33 includes a side wall portion 33a which is spaced apart outward in the vehicle width direction from the side wall portion 32a of the inner plate member 32, an upper wall portion 33b protruding inward in the vehicle width direction from the upper end of the side wall portion 33a, and a lower wall portion 33c protruding inward in the vehicle width direction from the lower end of the side wall portion 33a. The outer plate member 33 has a recess shape which opens inward in the vehicle width direction.

Each of the upper wall portion 33b and the lower wall portion 33c of the outer plate member 33 has a length in the vehicle width direction that is larger than that of the upper wall portion 32b and the lower wall portion 32c of the inner plate member 32. The upper wall portion 33b of the outer plate member 33 overlaps with the upper surface of the upper wall portion 32b of the inner plate member 32 from above. The tip end of the upper wall portion 33b of the outer plate member 33 is joined to the upper surface of the upper wall portion 32b of the inner plate member 32, by fillet welding. The lower wall portion 33c of the outer plate member 33 overlaps with the lower surface of the lower wall portion 32c of the inner plate member 32 from below. The tip end of the lower wall portion 33c of the outer plate member 33 is joined to the lower surface of the lower wall portion 32c of the inner plate member 32, by fillet welding. A weld line W at an interface between the inner plate member 32 and the outer plate member 33 is located inward in the vehicle width direction relative to a center C in the vehicle width direction, of the branch section 25 and the rear section 26.

Like the branch section 25 and the rear section 26, each of the front section 24 and the pivot flame member 12 includes an inner plate member and an outer plate member which are joined to each other by welding, and has a closed cross-section of a rectangular shape which is vertically elongated, in a direction perpendicular to its lengthwise direction so as to form an inner hollow space.

A region in which the swing arm 16 is pivoted around the pivot shaft 12a, namely, the region in which the rear wheel 3 is vertically pivoted, is determined by a most extended position and a most contracted position set in the rear suspension 18. The front section 24, the branch sections 25 and the rear sections 26 are disposed in a region outside of the motion trajectory of the rear wheel 3, in a case where the swing arm 16 is pivoted within the predetermined pivot region above. Specifically, when the pivot angle of the swing arm 16 lies in at least a portion of the above-predetermined pivot region, the branch section 25 and the rear section 26 overlap with the rear wheel 3 when viewed from the side. More specifically, in a state in which the swing arm 16 is pivoted upward to be closest to the rear frame unit 8, i.e., pivoted to an uppermost position, a portion of the branch section 25 and a portion of the rear section 26 overlap with the upper portion of the rear wheel 3, when viewed from the side (see FIG. 3). In a state in which the swing arm 16 is pivoted upward to be closest to the rear frame unit 8, the lower end of the rear end portion 24a of the front section 24 is located below and in front of the upper end of the rear wheel 3. Further, in a state in which the swing, arm 16 is pivoted upward to be closest to the rear frame unit 8, the rear end portion 24a of the front section 24 is located rearward relative to the from end of the rear wheel 3.

The vehicle body frame 5 further includes the auxiliary frame members 21 connecting the front frame unit 7 to the rear sections 26. The auxiliary frame members 21 are connected to the front frame unit 7 in locations that are below a portion of the front frame unit 7 to which the front section 24 is connected. In other words, the front end portions 21a of the auxiliary frame members 21 are located below the front end portion of the front section 24. In the present embodiment, the front end portions 21a of the auxiliary frame members 21 are connected to the front frame unit 7 in locations that are below the pivot shaft 12a. Specifically, the front end portions 21a of the auxiliary frame members 21 are fastened to the reinforcement plates 23 provided on the right and left sides relative to the pivot frame member 12, respectively, by use of bolts.

The rear end portions 21b of the auxiliary frame members 21 are connected to the rear sections 26, respectively, from outside in the vehicle width direction. Bosses 26a protrude from the outer side surfaces of the rear sections 26 in the vehicle width direction, to fasten the rear end portions 21b of the auxiliary frame members 21 to the rear sections 26, respectively, by use of bolts. The locations at which the rear end portions 21b of the auxiliary frame members 21 are connected to the rear sections 26, respectively, correspond to the location of the first bridge section 28 in the forward and rearward direction. The rear frame unit 8 extends to be inclined upward as the rear frame unit 8 extends rearward. The portion of the rear frame unit 8 which is rearward relative to the locations (the bosses 26a) at which the rear frame unit 8 is connected to the auxiliary frame members 21, extends horizontally or downward as the portion extends rearward. A portion of each of the rear sections 26, which is in front of the location at which the rear section 26 is connected to the rear end portion 21b of the auxiliary frame member 21, is smaller in changing magnitude of section modulus than a portion of each of the rear sections 26, which is rearward relative to the location at which the rear section 26 is connected to the rear end portion 21b of the auxiliary frame member 21.

The front end portions of the accessory brackets 35 are connected to the rear end portions 21b of the auxiliary frame members 21, respectively. The rear end portions of the accessory brackets 35 are fastened to the rear end portions of the rear sections 26, respectively, by use of bolts. The accessory brackets 35 are formed of plate members elongated in the forward and rearward direction. For example, each of the accessory brackets 35 has a bolt hole 35a via which an accessory component such as a pannier case can be mounted to the vehicle body frame 5. The rear portion of the auxiliary frame member 21 and the accessory bracket 35 are covered by the cover 22 which is elongated in the forward and rearward direction (see FIG. 1. Footrests 36 are attached to the intermediate portions of the auxiliary frame members 21, respectively so that the passenger seated on the tandem seat 20 can rest their feet thereon.

The vertical dimension of each of the branch section 25 and the rear section 26 is varied in its lengthwise direction, and the dimension in the rightward and leftward direction, of each of the branch section 25 and the rear section 26 is varied in its lengthwise direction. More specifically, the dimension W1 of the rear section 26 in the rightward and leftward direction is smaller than the dimension W2 of the branch section 25 in the rightward and leftward direction. The dimension W2 of the branch section 25 in the rightward and leftward direction is smaller than the dimension W3 of the front section 24 in the rightward and leftward direction. The rear section 26 includes a vertically-elongated portion 26b having a vertical dimension larger than those of adjacent portions of the rear section 26 which are adjacent to the vertically-elongated portion 26b in the lengthwise direction. The vertical dimension H1 of the vertically-elongated portion 26b of the rear section 26 is larger than the vertical dimension H2 of the branch section 25. The vertical dimension H2 of the branch section 25 is smaller than the vertical dimension H3 of the front section 24. The vertically-elongated portion 26b is a connection portion of the rear section 26 to which the auxiliary frame member 21 is connected, and is formed with the boss 26a. The portion of the rear section 26, which is rearward relative to the portion of the rear section 26 to which the auxiliary frame member 21 is connected has a shape in which its dimension (width) in the rightward and leftward direction is gradually decreased, and its outer surface in the rightward and leftward direction extends to be inclined inward in the rightward and leftward direction as the outer side surface extends rearward.

In accordance with the above-described configuration, since the pair of rear sections 26 are placed rightward and leftward relative to the rear wheel 3, the branch sections 25 and the front section 24 can be placed at lower positions, while preventing an interference with the rear wheel 3. This makes it easier to place the rider seat 17 at a lower position. In addition, since the branch sections 25 are provided rearward relative to the front frame unit 7, the dimension in the rightward and leftward dimension, of the frame, namely, the front section 24, which is located between the front frame unit 7 and the branch sections 25 of the rear frame unit 8, can be reduced. In this configuration, the space in which the components mounted to the vehicle body are placed can be ensured easily, even though the rider seat 17 is placed at a lower position. Therefore, the height of the seat can be reduced, and the space in which the components mounted to the vehicle body are placed can be ensured.

Since a portion of each of the rear sections 26 overlaps with a portion of the rear wheel 3 when viewed from the side, in a state in which the swing arm 16 is pivoted to be closest to the rear frame unit 8, the position of the front section 24 can be further lowered, while preventing an interference between the branch section 25 and the rear wheel 3. Therefore, the rider can ground the rider's feet more easily. Also, since a portion of each of the branch sections 25 overlaps with a portion of the rear wheel 3 when viewed from the side, in a state in which the swing arm 16 is pivoted to be closest to the rear frame unit 8, the front section 24 can be placed in a location that is as forward as possible, and hence the length of the branch sections 25 in the forward and rearward direction can be increased. This can make the branch sections 25 curved gently. Thus, the rear frame unit 8 can be formed easily.

Since the dimension of the rear section 26 in the rightward and leftward direction is smaller than the dimension of the branch section 25 in the rightward and leftward direction, the dimension of the whole of the vehicle body in the rightward and leftward direction is not increased. Although the dimension of the rear section 26 in the rightward and leftward direction is smaller than the dimension of the branch section 25 in the rightward and leftward direction, the rear section 26 includes the vertically-elongated portion 26b having a vertical dimension larger than that of the branch section 25. The vertically-elongated portion 26b can suitably prevent a decrease in the stiffness of the rear section 26. In other words, the rear section 26 which is limited in the vehicle width of the vehicle body includes the vertically-elongated portion 26b having a larger vertical dimension. This makes it possible to prevent an increase in the width of the whole of the rear frame unit 8 while increasing strength. Each of the branch sections 25 is located inward in the rightward and leftward direction relative to the corresponding rear section 26 and has a dimension in the rightward and leftward direction that is larger than that of the corresponding rear section 26. In this structure, it becomes possible to form an appropriate clearance between the branch section 25 and other components in the vertical direction, while increasing the strength of the branch section 25. The portion of the rear section 26 to which the auxiliary frame member 21 is connected, namely, the vertically-elongated portion 26b, has a vertical dimension larger than those of adjacent portions of the rear section 26 which are adjacent to the vertically-elongated portion 26b in the lengthwise direction. Therefore, the stiffness of the portion of the rear section 26 to which the auxiliary frame member 21 is connected is increased and the stiffness of the remaining portion of the rear section 26 is reduced. In this way, the weight of the rear section 26 can be reduced, and the strength of the rear section 26 can be maintained. As a result, it becomes possible to realize an increase in the strength of the rear frame unit 8, a decrease in the width of the vehicle body, more flexible layout of the members, and a decrease in the weight of the vehicle body.

Each of the branch section 25 and the rear section 26 includes the inner plate member 32 and the outer plate member 33 which are joined to each other by welding and has the closed cross-section in the direction perpendicular to its lengthwise direction. In this structure, each of the branch section 25 and the rear section 26 can be easily formed to have a shape in which the outer dimension of the cross-section in the direction perpendicular to its lengthwise direction is varied along the lengthwise direction. Also, since the rear frame unit 8 tends to be subjected to a vertical load, the configuration in which the pair of left and right plate members 32, 33 are joined to each other can contribute to an increase in the stiffness. Further, since the rear frame unit 8 has a hollow structure formed by the inner and outer plate members 32, 33, the weight of the rear frame unit 8 can be reduced while preventing a decrease in the stiffness.

Since the auxiliary frame members 21 are connected to the front frame unit 7 in the locations that are below the front section 24, the rear frame unit 8 can be reinforced while securing the space in which the components mounted to the vehicle body are placed below the front section 24. The right and left ends of each of the bridge sections 28, 29, are connected to the upper ends of the rear sections 26. Each of the bridge sections 28, 29 has the circular-arc shape protruding upward when viewed from the rear. In the configuration of the bridge sections 28, 29, even in the state in which the swing arm 16 is pivoted to be closest to the rear frame unit 8, a distance between each of the bridge sections 28, 29 and the rear wheel 3 can be ensured appropriately. Also, in the configuration in which the right and left ends of each of the bridge sections 28, 29 are connected to the upper ends of the rear sections 26, a distance between the pair of right and left rear sections 26 in the rightward and leftward direction can be ensured appropriately.

As described above, the portion of the rear section 26, which is rearward relative to the portion of the rear section 26 to which the auxiliary frame member 21 is connected has a shape in which its dimension in the rightward and leftward direction is gradually decreased, and its outer surface in the rightward and leftward direction extends to be inclined inward in the rightward and leftward direction as the outer side surface extends rearward. In this configuration, the width of the rear portion of the vehicle body can be reduced appropriately, while reducing a load exerted on the portion of the rear section 26 to which the auxiliary frame member 21 is connected.

The present invention is not limited to the above-described embodiment. The above-described configuration may be changed, added to, or deleted from, within a scope of the spirit of the preset invention. Although in the above-described embodiment, the internal combustion engine 14 is used as the motor, an electric motor may be used instead. Further, a portion of the rear wheel 3 may not overlap with the rear frame unit 8 when viewed from the side, in the state in which the rear wheel 3 is closest to the rear frame unit 8. Further, although in the above-described embodiment, the rear frame unit 8 includes the pair of plate members 32, 33 which are joined to each other by welding and has the closed cross-section, the rear frame unit 8 may be manufactured by forging. Moreover, although the front section 24 is placed to overlap with the vehicle body center line L in the vehicle width direction, it may extend in the forward and rearward direction without overlapping with the vehicle body center line L.

The motorcycle of the present invention can obtain the above-described advantage and is effectively applicable to any motorcycle which can exhibit this advantage.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A motorcycle comprising:
   a rear wheel;
   a motor which generates driving power for driving the rear wheel;
   a seat on which a rider is seated;
   a vehicle body frame including a front frame unit supporting the motor, and a rear frame unit supporting the seat; and
   a swing arm which is rotatably connected to the front frame unit and supports the rear wheel in a state in which the swing arm is vertically pivotable around a pivot shaft at which the swing arm is connected to the front frame unit,
   wherein the rear frame unit includes:
      a front section which supports the seat and extends rearward from the front frame unit and is located rearward relative to the pivot shaft;
      a pair of right and left branch sections extending rearward from a rear end portion of the front section to be spaced apart from each other in a rightward and leftward direction; and
      a pair of rear sections which extend rearward from rear end portions of the pair of right and left branch sections, respectively, and are placed rightward and leftward relative to the rear wheel, and
   wherein a lower end of the rear end portion of the front section is located below and in front of an upper end of the rear wheel in a state in which the swing arm is pivoted upward and becomes closest to the rear frame unit.

2. The motorcycle according to claim 1,
   wherein a portion of each of the rear sections overlaps with a portion of the rear wheel when viewed from a side of the motorcycle, in a state in which at least the swing arm is pivoted to be closest to the rear section.

3. The motorcycle according to claim 1,
   wherein a portion of each of the branch sections overlaps with a portion of the rear wheel when viewed from a side of the motorcycle, in a state in which at least the swing arm is pivoted to be closest to the rear section.

4. The motorcycle according to claim 1,
   wherein the rear sections have a dimension in the rightward and leftward direction that is smaller than a dimension of the branch sections in the rightward and leftward direction.

5. The motorcycle according to claim 4,
   wherein each of the rear sections includes a portion having a vertical dimension larger than a vertical dimension of the branch section.

6. A motorcycle comprising:
   a rear wheel;
   a motor which generates driving power for driving the rear wheel;
   a seat on which a rider is seated;
   a vehicle body frame including a front frame unit supporting the motor, and a rear frame unit supporting the seat; and
   a swing arm which is rotatably connected to the front frame unit and supports the rear wheel in a state in which the swing arm is vertically pivotable around a pivot shaft at which the swing arm is connected to the front frame unit,
   wherein the rear frame unit includes:
      a front section which supports the seat and extends rearward from the front frame unit;
      a pair of right and left branch sections extending rearward from a rear end portion of the front section to be spaced apart from each other in a rightward and leftward direction; and
      a pair of rear sections which extend rearward from rear end portions of the pair of right and left branch sections, respectively, and are placed rightward and leftward relative to the rear wheel,
   wherein the rear sections have a dimension in the rightward and leftward direction that is smaller than a dimension of the branch sections in the rightward and leftward direction,
   wherein each of the branch sections includes a pair of right and left members which are joined to each other by welding and has a closed cross-section in a direction perpendicular to a lengthwise direction of the branch section, and
   wherein each of the rear sections includes a pair of right and left members which are joined to each other by welding and has a closed cross-section in a direction perpendicular to a lengthwise direction of the rear section.

7. The motorcycle according to claim 1,
   wherein the vehicle body frame further includes auxiliary frame members connecting the front frame unit to the rear sections of the rear frame unit, and
   wherein each of the auxiliary frame members is connected to the front frame unit in a location that is below a portion of the front frame unit, the portion being connected to the front section of the rear frame unit.

8. The motorcycle according to claim 7,
   wherein each of the rear sections of the rear frame unit has a connection portion connected to the auxiliary frame member, and the connection portion has a vertical dimension larger than a vertical dimension of an adjacent portion of the rear section which is adjacent to the connection portion in a lengthwise direction of the rear section.

9. The motorcycle according to claim 1,
   wherein the rear frame unit further includes a bridge section connecting the pair of rear sections to each other in the rightward and leftward direction,
   wherein right and left ends of the bridge section are connected to upper ends of the pair of rear sections, respectively, and
   wherein the bridge section has a circular-arc shape protruding upward when viewed from a rear of the motorcycle.

10. The motorcycle according to claim 1,
    wherein the whole of the branch sections and the rear sections have a circular-arc shape protruding upward when viewed from a side of the motorcycle.

11. The motorcycle according to claim 6,
    wherein each of the closed cross-sections of the branch sections and the rear sections is vertically elongated.

12. The motorcycle according to claim 6,
    wherein the right and left members of each of the branch sections and the rear sections are respectively inner and outer plate members,
    the inner plate member includes a side wall portion, an upper wall portion protruding outward in a vehicle width direction from an upper end of the side wall portion, and a lower wall portion protruding outward in the vehicle width direction from a lower end of the side wall portion, and the inner plate member has a recess shape which opens outward in the vehicle width direction, and the outer plate member includes a side wall portion which is apart outward in the vehicle width direction from the side wall portion of the inner member, an upper wall portion protruding inward in the vehicle width direction from the upper end of the side wall portion, and a lower wall portion protruding inward in the vehicle width direction from the lower end of the side wall portion, and the outer plate member has a recess shape which opens inward in the vehicle width direction.

13. The motorcycle according to claim 12, wherein the upper wall portion of the outer plate member overlaps with the upper surface of the upper wall portion of the inner plate member from above, and the lower wall portion of the outer plate member overlaps with the lower surface of the lower wall portion of the inner plate member from below.

14. The motorcycle according to claim 6, wherein each of the rear sections of the rear frame unit has a connection portion connected to an auxiliary frame member, and a region of the rear section, which is rearward relative to the connection portion of the rear section, has an outer side surface in the rightward and leftward direction, the outer side surface extending to be inclined inward in the rightward and leftward direction as the outer side surface extends rearward.

15. The motorcycle according to claim 9, wherein the bridge section comprising a first bridge section and a second bridge section being rearward relative to the first bridge, and a rider seat fastening portion for fastening the rider seat protrudes from an upper surface of the first bridge section, and a tandem seat fastening portion for fastening a tandem seat protrudes from an upper surface of the second bridge section.

* * * * *